March 7, 1950 — A. C. RADTKE — 2,500,043
SILO UNLOADING DEVICE
Filed Nov. 19, 1947 — 2 Sheets-Sheet 1

INVENTOR.
Adelbert C. Radtke
BY Paul O. Pippel
Atty.

March 7, 1950 — A. C. RADTKE — 2,500,043
SILO UNLOADING DEVICE
Filed Nov. 19, 1947 — 2 Sheets-Sheet 2

INVENTOR.
Adelbert C. Radtke
BY Paul O. Pippel
Atty.

Patented Mar. 7, 1950

2,500,043

UNITED STATES PATENT OFFICE 2,500,043

SILO UNLOADING DEVICE

Adelbert C. Radtke, Oak Park, Ill., assignor to International Harvester Company, a corporation of New Jersey Application November 19, 1947, Serial No. 786,983

1 Claim. (Cl. 222—252)

This invention relates to an unloading device for unloading ensilage from a silo, and more particularly it relates to a silo unloader suspended within a silo and arranged to remove sections of ensilage from the ensilage packed therein. More specifically, the invention relates to an improved discharge structure cooperating with an unloading mechanism for removing ensilage from within a silo.

The removal of ensilage from the upper end of a silo has been a difficult and hazardous problem since by ordinary methods the farm operator has to climb to the top of the silo and thereupon manually shovel out the ensilage. Silos are generally constructed with a cylindrical wall having a vertically extending slot therein. This slot is normally closed by a plurality of vertically positioned doors which are removed as the surface of the ensilage drops so that the operator thus will have an opening through which to remove the ensilage. By the utilization of mechanical unloaders the necessity of manually removing the ensilage has been eliminated, but it is still necessary for the operator to climb up along the outer wall of the silo and thereupon manually remove the doors as the level of the ensilage descends. Applicant has solved this problem by providing a novel unloading device that entirely eliminates this vexing and dangerous task. It is applicant's prime object therefore to provide a silo unloader wherein the removal of the silo doors is entirely unnecessary and the full length of the silo can be emptied without manual effort on the part of the operator.

Another object is to provide a silo unloader having means arranged to rotate on the upper surface of the ensilage, said unloader including a central tube associated therewith within the silo for removing ensilage therefrom.

Still another object is to provide a silo unloader for unloading ensilage from the silo, said unloader including a vertically extending tube having collapsible wall sections and being arranged to collapse and move downwardly within the silo as the level of the ensilage descends.

Still another object is to provide an improved discharge device for removing ensilage, said device including a tube extending vertically through the packed ensilage within the silo, said tube including a plurality of telescoping tubular sections which are interconnected and arranged to retract into one another upon the lowering of the ensilage level in the silo.

A still further object is to provide a discharge tube positioned within the silo, said tube being arranged to receive and discharge ensilage therefrom, and conveyor means associated with said tube for delivering ensilage outwardly of the silo.

These and other objects will become more readily apparent as the description proceeds when read in conjunction with the annexed drawings.

Figure 1:
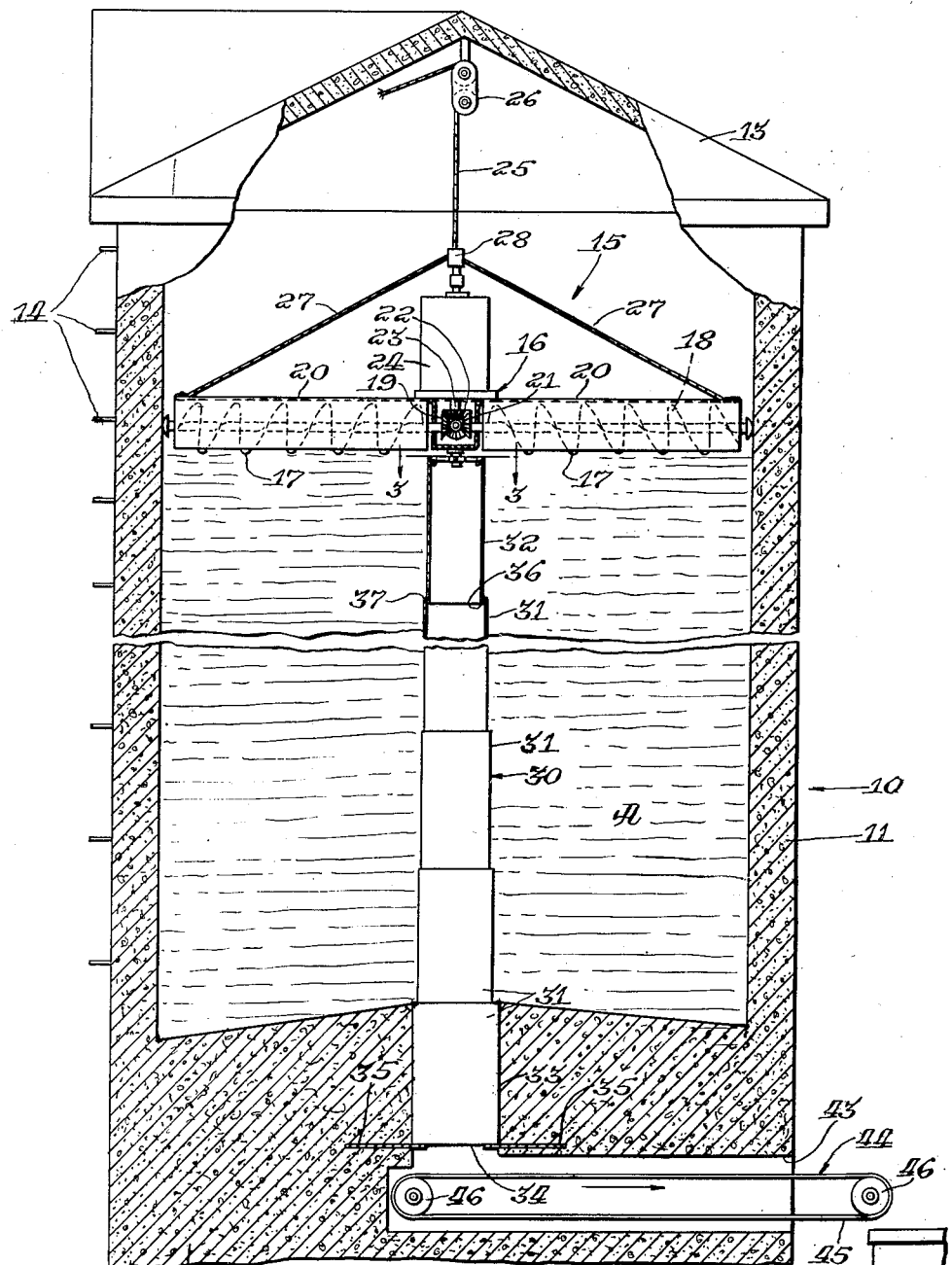
Figure 1 is a sectional view through a vertical silo, said view showing a silo unloading device.

As shown in Figure 1, a silo is generally designated by the reference character 10. The silo 10 includes a cylindrical wall 11, preferably of concrete construction, having a base section 12. A roof 13 is supported on the upper end of the cylindrical wall 11 and a plurality of rungs 14 connected to the outer wall of the silo 10 form a conventional type of silo ladder.

A silo unloading or gathering mechanism is generally designated by the reference character 15. The silo unloading mechanism 15 is arranged to be supported on the upper surface of a quantity of packed ensilage designated by the letter A. The unloading mechanism 15 includes a supporting structure 16. A plurality of augers or helical blades extend radially outwardly from the supporting structure 16 to the inner peripheral wall of the silo. The helical blades 17 are supported for rotation with shafts 18 which extend inwardly into a gear box or housing 19. Shields 20 of cylindrical shape are connected to the housing 19 and are positioned to partially enclose and cover the helical blades 17.

The housing 19 includes a plurality of beveled gears 21, one of which is connected to the end of each shaft 18. A drive bevel gear 22 is in meshing engagement with the gears 21 and is in turn connected to a shaft 23. The shaft 23 extends upwardly into a motor housing 24 which contains an electrical power unit (not shown). It is to be understood that the power unit is preferably of the electrical type, though any suitable power arrangement may be utilized. A cable 25 is secured to the upper end of the housing 24 and is in turn wound about a hoist member 26. The cable 25 is arranged to move the silo unloading or gathering mechanism 15 vertically within the silo. A plurality of supporting members 27 are connected at one end to the shields 20 and at their other end to a swivel member 28 through which the cable 25 loosely extends.

Figure 3:
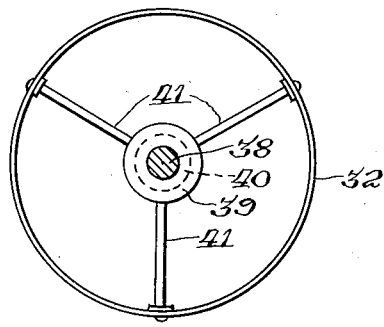
Figure 3 is a sectional view taken along the line 3—3 of Figure 1.
Figure 5:
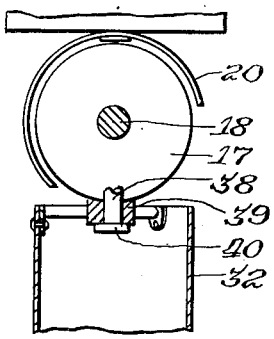
Figure 5 is a sectional view taken along the line 5—5 of Figure 4.

A vertically extending discharge tube is generally designated by the reference character 30. The tube 30 extends upwardly within the silo and is centrally positioned. The tube 30 includes a plurality of telescoping sections 31 and has at its upper end an upper section 32 and at its lower end a base section 33. As best shown in Figure 3 the upper section 32 is open at the top and is arranged to provide a collar means for receiving the ensilage as it is gathered by the ensilage gathering mechanism. The base section 33 is also open as indicated at 34 at its lower end and is rigidly secured within the base section 12 of the silo 10. The base section 33 rests upon a plurality of bars 35 firmly embedded within the concrete base.

Figure 2:
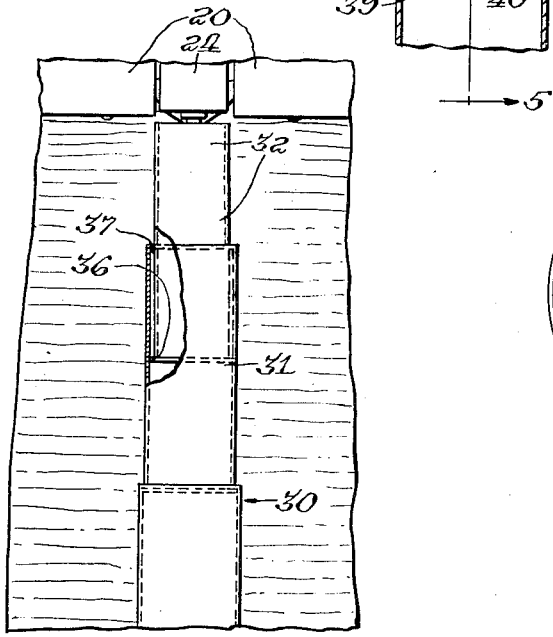
Figure 2 is an enlarged elevational view of a portion of a silo unloading device.

As best shown in Figure 2 the telescoping sections 31 are each provided with a lower outwardly projecting annular rim 36 and an upper inwardly projecting rim 37 which cooperate with one another to limit the extension of the discharge tube 30.

Figure 4:
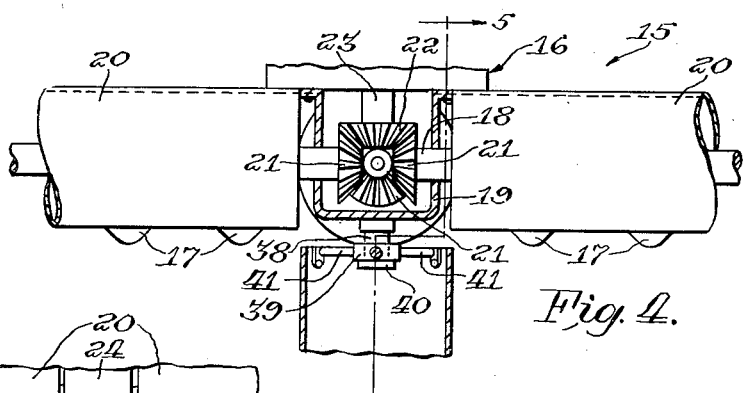
Figure 4 is an enlarged elevational view, partially in section, showing the driving arrangement for an ensilage gathering mechanism.

As best shown in Figure 4 a shaft 38 extends downwardly from the housing 19. The shaft 38 projects through a bearing member 39 and is held in said bearing member by means of a thrust collar 40. The bearing member 39 has connected thereto a plurality of radially extending arms 41 which have their ends connected to the upper tubular section 32. The shaft 38 is therefore arranged to pivot within the bearing member 39.

As best shown in Figures 1 and 2 the silo base 12 is provided with a horizontally extending passage 43 which is in communication with the tube 30. The passage 43 houses a conveyor 44 provided with a conventional type of endless belt 45 journaled about rollers 46. The conveyor 44 may be driven by any suitable conventional drive construction.

The motor within the motor housing 24 rotates the helical blades 17 about their horizontal axes by means of the bevel gearing shown within the housing 19. As these blades are rotated they engage the ensilage, thereby causing the ensilage to be moved radially inwardly toward the discharge tube 30. As the blades are thus rotating, they force themselves into engagement with the ensilage and in turn drive and rotate the mechanism bodily about the vertical axis of the silo. The augers therefore are thus moved circumferentially within the silo and thereupon effect even removal of ensilage from the surface. By virtue of the rotatable connection of the shaft 38 with the bearing member 39 the silo gathering mechanism is free to rotate with respect to the discharge tube 30, said tube remaining stationary. The ensilage is delivered inwardly into the upper end of the tube 30 and thereupon descends downwardly to the conveyor 44, whereupon it is removed from the silo.

The cable 25 during the operation is slackened so that the mechanism is free to rest upon the upper surface of the ensilage. The level of ensilage, of course, decreases within the silo and as the ensilage unloader descends downwardly with the level of the ensilage the telescoping sections 31 collapse or are retracted into one another so that the upper section 32 of the tube is at all times substantially adjacent the level of the ensilage.

In Figure 2 the tube 30 is shown having its upper section 32 in a partially collapsed or retracted position and the collapse of the tube continues until the unloader mechanism is near the lower end of the silo. When the greater portion of the silage has been removed in this manner and it is again desired to load the silo, the operator merely raises the ensilage unloading mechanism by means of the cable 25 and hoist 26. Upon raising of the ensilage mechanism the telescoping sections 31 of the tube 30 are thereupon again extended to their upwardly extended position.

It can now be seen that applicant has provided a novel ensilage unloading device. In the device shown it is clear that the operator is spared the unpleasant task of climbing up the side of the silo during the operation of the unloading mechanism. In a silo of this type the vertical slot and door construction can be entirely dispensed with since the removal of ensilage is entirely through the tube 30.

It is to be understood that modifications and changes in the design of this construction may be made which do not depart from the spirit of the invention as disclosed nor the scope thereof as defined in the appended claim.

What is claimed is:

An ensilage unloading device for removing ensilage comprising in combination with a silo having a base and a cylindrical wall extending upwardly from said base; a discharge tube substantially centrally positioned within the silo, said tube including a plurality of interconnected telescoping tubular sections, an upper section for said discharge tube, said upper section having an intake opening in communication with the silo above the packed ensilage, a lower section for said discharge tube, said lower section being completely embedded in the base of said silo and including a discharge end, a horizontally extending conveyer within the base of said silo, said conveyer being arranged to receive material from the discharge tube for conveying the material from the silo, an ensilage gathering mechanism positioned above the upper section, said mechanism including a gear box in axial alignment with the upper section, a vertical shaft connected to and projecting downwardly from said gear box, a bearing member connected to the upper section, said vertical shaft being journalled in said bearing member, gearing within the gear box, said gearing including rotatable drive shafts horizontally projecting outwardly of the gear box, auger blades connected to said horizontal shafts for rotation therewith, said auger blades extending radially adjacent to the inner surface of the cylindrical wall, a shield partially enclosing each auger blade, each shield having an opening at its lower end through which the auger blades project, drive means projecting upwardly through the gear box and for actuating the gearing and said horizontal shafts whereby the auger blades are rotated about their own axis, said gear box and said auger blades being rotatable circumferentially about the vertical axis of the silo thereby gathering ensilage and directing the same inwardly to the intake opening of the upper section, and hoist means for lowering the gathering mechanism with the lowering of the ensilage level in the silo whereby said tubular sections are completely retracted into the lower section and completely into the base of the silo.

ADELBERT C. RADTKE.

REFERENCES CITED

The following references are of record in the file of this patent:

UNITED STATES PATENTS

| Number | Name | Date |
|--------|------|------|
| 670,582 | Erisman | Mar. 26, 1901 |
| 2,430,203 | Bailey | Nov. 4, 1947 |

FOREIGN PATENTS

| Number | Country | Date |
|--------|---------|------|
| 485,957 | Great Britain | May 27, 1938 |